United States Patent [19]

McLaughlin

[11] Patent Number: 4,581,804
[45] Date of Patent: Apr. 15, 1986

[54] METHOD FOR MAKING INSULATED PIPE

[75] Inventor: Hugh T. McLaughlin, Santa Ana, Calif.

[73] Assignee: Ameron, Inc., Monterey Park, Calif.

[21] Appl. No.: 612,659

[22] Filed: Sep. 12, 1975

[51] Int. Cl.$^4$ .............................................. B23P 11/02
[52] U.S. Cl. ................................. 29/451; 29/157 R; 29/235; 53/432; 53/423; 53/455; 138/149
[58] Field of Search ............. 29/451, 235, 423, 455 R, 29/421 R, 157 R; 138/149

[56] References Cited

U.S. PATENT DOCUMENTS

| 284,050 | 8/1883 | Nichols | 29/450 UX |
|---|---|---|---|
| 2,570,259 | 10/1951 | McKinley | 29/235 UX |
| 2,949,953 | 8/1960 | Di Maio et al. | |
| 3,012,315 | 12/1961 | Stillwagon | 29/423 |
| 3,020,192 | 2/1962 | Stephens et al. | 29/235 X |
| 3,035,331 | 5/1962 | Wieman | 29/451 UX |
| 3,137,148 | 6/1964 | Kayser | 29/450 UX |
| 3,222,777 | 12/1965 | Rutter et al. | 29/157 R X |
| 3,447,230 | 6/1969 | Bargainnier et al. | 29/421 X |
| 3,458,966 | 8/1969 | Dunbar et al. | |
| 3,921,273 | 11/1975 | Kondo et al. | 29/451 X |

FOREIGN PATENT DOCUMENTS

| 1802977 | 5/1968 | Fed. Rep. of Germany . |
| 6802707 | 10/1968 | Netherlands . |
| 6805070 | 10/1968 | Netherlands . |
| 1184550 | 8/1966 | United Kingdom . |

Primary Examiner—Charlie T. Moon
Attorney, Agent, or Firm—Christie, Parker & Hale

[57] ABSTRACT

An insulated pipe for conducting high and low temperature fluids includes a rigid carrier pipe, a layer of volumetrically compressible insulating material around the O.D. of the carrier pipe, and a protective outer pipe around the insulating layer. The method of making the pipe product includes placing a closed flexible bag around the carrier pipe and the insulating layer, and then drawing a vacuum on the interior of the bag to compress the insulating layer. The outer pipe is slid lengthwise over the compressed insulating layer, and the vacuum is then removed to allow the insulation to partially expand and fill the annulus between the carrier pipe and the outer pipe.

15 Claims, 3 Drawing Figures

METHOD FOR MAKING INSULATED PIPE

CROSS REFERENCE TO RELATED APPLICATIONS

This is a continuation of application Ser. No. 513,481, filed Oct. 9, 1974, now abandoned.

BACKGROUND

This invention relates to insulated pipe and a method for making such pipe.

Piping systems for conducting high and low temperature fluids generally include an inner carrier pipe for conducting the fluid, a layer of insulation surrounding the O.D. of the carrier pipe, and a tubular outer jacket or shell around the insulating layer. The insulation provides a low thermal conductivity layer around the carrier pipe to maintain steady temperatures within the fluid being conducted. The outer jacket or shell protects the insulation against water absorption.

In one prior art method of making insulated pipe, a polyvinyl chloride outer shell is extruded around the carrier pipe, and a foam insulating layer is injected into the annulus between the extruded shell and the carrier pipe in a continuous process. This process is time consuming and it requires costly equipment to carry out the continuous process. Moreover, the extrusion process limits the pipe to the use of thermoplastics for the outer shell which are limited in their temperature capabilities.

In another prior art method of making insulated pipe, the insulation layer is made from fiberglass felt. It is common practice to increase the density of the fiberglass felt by impregnating the glass fibers with resin, and then compacting the felt within the heated mold to cure the resin. This produces a rigid fiberglass layer of the desired shape and high density. The increased density is desirable because of the added thermal resistance to heat flow desired for a given thickness of insulation. The rigid fiberglass layer usually is molded in semi-circular shaped half shell blocks which are attached to the O.D. of the carrier pipe. The outer jacket or shell is then placed around the fiberglass blocks. It is difficult to slide a rigid tubular outer shell lengthwise along the O.D. of the rigid fiberglass blocks and have the insulating layer completely fill the annular space between the carrier pipe and the shell. This problem can be avoided by extruding an outer shell around the insulation layer, but this has the disadvantages of being costly, time consuming, and temperature-limiting as discussed above.

SUMMARY

This invention provides a method of making insulated pipe which eliminates the need for extruding an outer protective shell around the insulation layer. The method also provides a relatively high density insulation layer without the costly, time consuming steps of molding the fiberglass resin and then applying heat to cure the resin.

Briefly, the method includes wrapping a layer of volumetrically compressible insulating material around the exterior of a rigid carrier pipe, and then placing a closed flexible tube around the carrier pipe and the insulation layer. A vacuum is then drawn on the interior of the tube to compress the insulation around the exterior of the carrier pipe. A rigid outer shell is slid lengthwise over the compressed insulation layer and the carrier pipe. After the outer shell is in place, the vacuum is removed to allow the insulation to expand and fill the space between the carrier pipe and the inner surface of the shell.

The invention also provides a novel insulated pipe construction which includes a rigid carrier pipe, an outer shell disposed concentrically around and spaced from the carrier pipe, a partially compressed, volumetrically deformable, resilient insulation layer in the space between the carrier pipe and the outer shell, and a layer of flexible, imperforate material between the outer shell and the insulating layer.

These and other aspects of the invention will be more fully understood by referring to the following detailed description and the accompanying drawings.

DRAWINGS

DESCRIPTION

Figure 1:
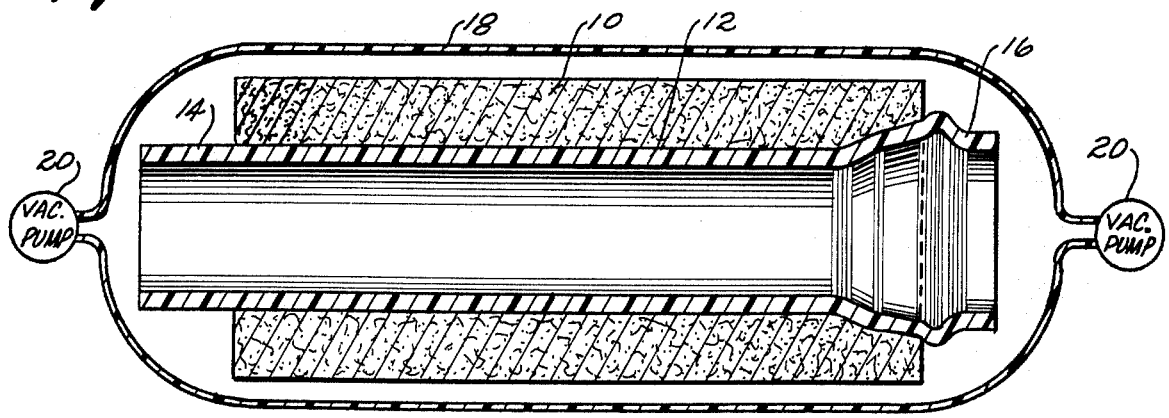
FIG. 1 is a schematic cross-sectional elevation view illustrating a method according to this invention for compressing an insulating layer applied to the O.D. of a carrier pipe.

Referring to FIG. 1, a layer 10 of volumetrically compressible insulating material is initially wrapped around the exterior of an elongated carrier pipe 12. The carrier pipe 12 is preferably the type of pipe generally used in conducting low temperature or high temperature fluids under pressure. Such pipe can be made from extruded thermoplastic such as polyvinyl chloride, although it is presently preferred that such pipe be filament-wound plastic pipe made from thermosetting resinous materials. The pipe is shown with a spigot end 14 and a bell end 16 for the purpose of joining several sections of the pipes 12 to form a suitable high pressure piping system.

The insulation layer 10 preferably comprises a layer of volumetrically compressible fiberglass insulating felt which is wrapped around the O.D. of the carrier pipe and then held on the pipe by stapling the insulation together, although a band of tape (not shown) can be used, or the insulation layer can be bonded to the O.D. of the carrier pipe. Other types of insulation material also can be used, such as polyurethane foam, or other porous, resilient foam materials, so long as the insulation layer provides the desired low thermal conductivity, and is volumetrically compressible.

The entire carrier pipe and insulation layer are enclosed in the hollow interior of a flexible, imperforate tube 18, or other suitable flexible sheet or film which is capable of encasing the carrier pipe and the insulation layer for the purpose of drawing a vacuum around them. In the preferred application, the tube 18 is a flexible polyethylene bag, at least one end of which is connected to a vacuum pump 20. Although the drawing shows both ends of the polyethylene bag connected to separate vacuum pumps, the presently preferred method is to draw a vacuum from only one end of the bag, while the other end of the bag is closed, such as by tying or sealing the end of the bag to provide an airtight enclosure around the carrier pipe and the insulation layer.

Figure 2:
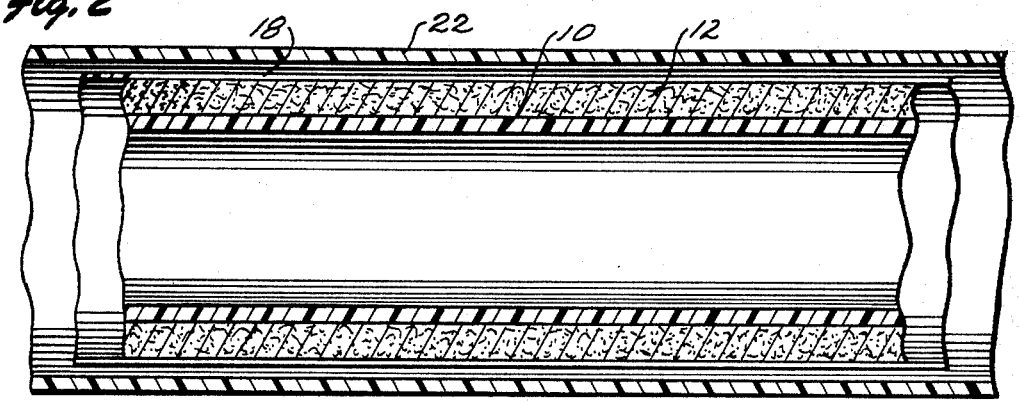
FIG. 2 is a fragmentary schematic cross-sectional elevation view illustrating an outer pipe placed around the compressed layer of insulation.
Figure 3:
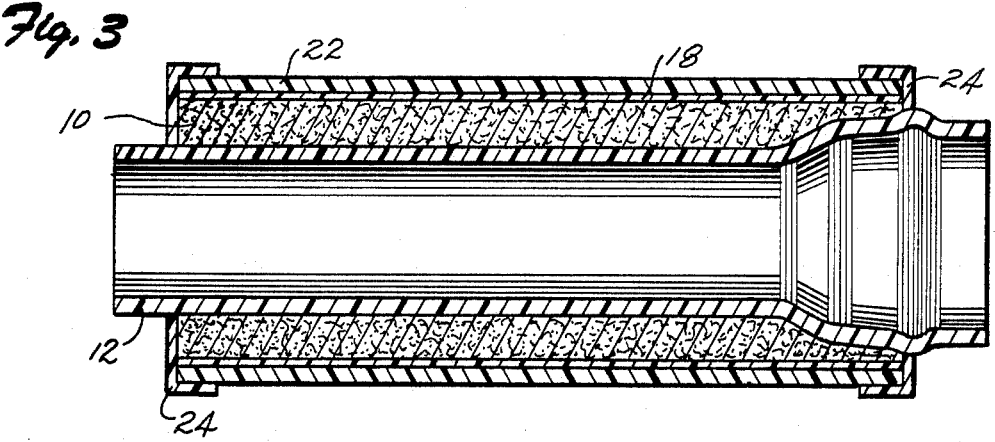
FIG. 3 is a schematic cross-sectional elevation view illustrating the finished insulated pipe of this invention.

As illustrated in FIG. 2, one or both of the vacuum pumps pulls a partial vacuum on the interior of the bag 18 so that atmospheric pressure will compress the volumetrically compressible layer of insulation. The vacuum compresses the layer a sufficient amount to allow a rigid outer tube or shell 22 to be slid lengthwise over the plastic bag and the insulation layer. A large vacuum pump is not necessary, since only about five inches of vacuum (thirty inches being total vacuum) is necessary to produce the required compression. In fact, suitable compression for normal commercial length pipe sections can be produced simply by using the vacuum pump from a conventional vacuum cleaner.

Preferably, the outer pipe 22 is a filament-wound plastic pipe made from a thermosetting resinous material, although the plastic pipe can be any other type of rigid pipe which is of light weight construction and capable of protecting the insulation layer 12 from water absorption and other damage such as abrasion. When the outer pipe and inner carrier pipe are properly aligned, the vacuum is broken, preferably by cutting the two ends of the plastic bag 18, to allow the compressed resilient insulation layer to expand and fill the annulus between the two pipes. Preferably, the thickness of the insulation layer is chosen such that it only partially recovers to its normal uncompressed condition when the vacuum is broken, so that the insulation layer remains in a partially compressed condition. This provides means for adjusting the desired density of the insulation layer in the annulus.

Once the insulation layer is in place, the ends of the plastic bag can be trimmed appropriately and end seals 24 can be added to the ends of the pipe to provide the required protection against water absorption.

Thus, the method of this invention produces insulated pipe without requiring the expensive and time consuming prior art steps of extruding the outer shell and injecting foam insulation in a continuous process. Moreover, since the outer pipe 22 can be made in a separate process, the outer pipe can be a filament-wound plastic pipe made from thermosetting resinous materials which do not have the temperature limitations of thermoplastics. Further, the prior art process of molding the insulation layer in rigid half-shell blocks is eliminated. This avoids the need for adding resins to the fiberglass felt and then heating the resin in a mold to cure the resin. The insulated pipe provided by this invention also has the advantage of providing an insulating layer between the inner and outer pipes, which will allow a vacuum to be easily drawn on the insulating layer in the event such measures are necessary to reduce heat transfer for special low thermal conductivity applications.

I claim:

1. A method for making insulated pipe comprising the steps of wrapping a layer of resilient, volumetrically compressible insulating material around the exterior of a carrier pipe; placing a flexible enclosure around the insulation layer; drawing a vacuum on the interior of the enclosure to compress the insulation layer around the carrier pipe exterior; placing an outer shell over the compressed insulation layer and enclosure so the outer shell is around the carrier pipe; and releasing the vacuum in the enclosure so that the resilient insulation layer expands to fill the space between the carrier pipe and the inner surface of the shell.

2. The method according to claim 1 including the step of providing an insulation layer having a normal O.D. larger than the I.D. of the outer shell so that the insulation layer partially recovers its original volume after the volume is released to remain compressed from its normal condition between the carrier pipe and the outer shell.

3. The method according to claim 1 including the step of providing an insulation layer comprising fibrous insulating felt.

4. The method according to claim 1 including the step of providing an insulation layer comprising a porous foam material.

5. The method according to claim 1 including the step of providing an outer shell comprising a rigid outer pipe concentrically disposed around the carrier pipe.

6. The method according to claim 5 including the step of providing an outer shell comprising a filament-wound plastic pipe made from a thermosetting resinous material.

7. The method according to claim 6 including the step of providing a carrier pipe comprising a filament-wound plastic pipe made from a thermosetting resinous material.

8. The method according to claim 7 including the step of providing an insulation layer having a normal O.D. larger than the I.D. of the outer shell so that the insulation layer remains in a compressed condition between the outer shell and the carrier pipe after the vacuum is released.

9. The method according to claim 1 in which the enclosure comprises a flexible closed bag; and including the step of placing the closed bag around the entire exterior of the carrier pipe and the insulating layer prior to producing said vacuum.

10. A method for making insulated pipe which includes a carrier pipe, an outer shell surrounding the carrier pipe, and a layer of insulation in the annulus between the carrier pipe and outer shell, the method including the steps of wrapping a layer of porous, resilient, volumetrically compressible self-supporting insulation around the exterior of said carrier pipe, the insulation layer having a cross-sectional thickness such that its outside diameter is greater than the inside diameter of said outer shell; placing a flexible enclosure around the insulation layer; producing a vacuum in the interior of the enclosure to compress the cross-sectional thickness of the insulation layer around the exterior of the carrier pipe; placing said outer shell over the compressed insulation layer and enclosure so the outer shell surrounds the carrier pipe; and releasing the vacuum in the enclosure to partially expand the cross-sectional thickness of the resilient insulation layer to allow the layer to fill the annulus between the carrier pipe and the shell and remain compressed in the annulus by the expansive force exerted on the inside surface of the shell by the resilient layer.

11. The method according to claim 10 in which the enclosure comprises a flexible closed bag; and including the step of placing the closed bag around the entire exterior of the carrier pipe and the insulating layer prior to producing said vacuum.

12. The method according to claim 11 including the step of providing an outer shell comprising a filament-wound plastic pipe made from a thermosetting resinous material, and providing a carrier pipe comprising a filament-wound plastic pipe made of thermosetting resinous material.

13. The method according to claim 12 including the step of placing end seals over the annular end surface of the insulation layer at opposite ends of the pipe after the vacuum is released.

14. The method according to claim 11 in which the evacuated closed bag has closed ends, and including the step of cutting the closed ends of the bag to release the vacuum.

15. A method of manufacturing a heat insulator which comprises the steps of introducing between an outer casing and an inner casing an insert comprising a mass of fibrous material which has been compressed by vacuum-packing it in a hermetically sealed bag, and then unsealing said bag to permit said material to expand within said casing.

* * * * *

UNITED STATES PATENT AND TRADEMARK OFFICE
CERTIFICATE OF CORRECTION

PATENT NO. : 4,581,804
DATED : April 15, 1986
INVENTOR(S) : Hugh T. McLaughlin

It is certified that error appears in the above-identified patent and that said Letters Patent is hereby corrected as shown below:

In the Specification:

Column 1, line 60, before "volumetrically" insert -- resiliently --.
Column 1, line 68, delete "and fill" and insert therefor -- by partially returning to its original volume, thereby filling --.

Column 3, line 15, change "light weight" to -- lightweight --.
Column 3, line 24, delete "recovers" and insert therefor -- returns --.

In the Claims:

Column 3, line 55, before "carrier" insert -- rigid --.
Column 3, line 68, change "volume" to -- vacuum --.

Signed and Sealed this

Twenty-third Day of May, 1989

Attest:

DONALD J. QUIGG

*Attesting Officer*     Commissioner of Patents and Trademarks